United States Patent
Heim et al.

(10) Patent No.: US 8,830,626 B2
(45) Date of Patent: Sep. 9, 2014

(54) WRITE POLE WITH SHAPED BOX SHIELD

(71) Applicant: Seagate Technology LLC, Cupertino, CA (US)

(72) Inventors: Kevin Heim, Eden Prairie, MN (US); Jianhua Xue, Maple Grove, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/692,471

(22) Filed: Dec. 3, 2012

(65) Prior Publication Data

US 2014/0153133 A1 Jun. 5, 2014

(51) Int. Cl.
*G11B 5/127* (2006.01)
*G11B 5/105* (2006.01)

(52) U.S. Cl.
CPC ..................................... *G11B 5/105* (2013.01)
USPC ....................................................... 360/125.3

(58) Field of Classification Search
CPC ................................. G11B 5/127; G11B 5/10
USPC ............... 360/125.3, 125.03, 125.09, 125.04, 360/125.17, 125.12, 125.16, 125.06, 360/125.15, 125.26, 125.02, 125.31, 360/125.13, 125.23, 125.07, 125.14, 360/125.74, 123.01, 123.1
See application file for complete search history.

(56) References Cited

U.S. PATENT DOCUMENTS

| | | | |
|---|---|---|---|
| 7,253,995 B2 | 8/2007 | Takahashi et al. | |
| 7,649,712 B2 | 1/2010 | Le et al. | |
| 7,715,147 B2 * | 5/2010 | Feldbaum et al. | 360/125.3 |
| 7,979,978 B2 | 7/2011 | Han et al. | |
| 8,166,631 B1 | 5/2012 | Tran et al. | |
| 8,169,741 B2 | 5/2012 | Taguchi et al. | |
| 8,277,669 B1 | 10/2012 | Chen et al. | |
| 8,400,731 B1 * | 3/2013 | Li et al. | 360/125.01 |
| 8,542,463 B2 * | 9/2013 | Guan | 360/125.3 |
| 2005/0141137 A1 | 6/2005 | Okada et al. | |
| 2007/0211384 A1 * | 9/2007 | Hsiao et al. | 360/126 |
| 2007/0230046 A1 * | 10/2007 | Le et al. | 360/126 |
| 2008/0100959 A1 * | 5/2008 | Feldbaum et al. | 360/110 |
| 2008/0259498 A1 * | 10/2008 | Lengsfield et al. | 360/235.4 |
| 2009/0128953 A1 * | 5/2009 | Jiang et al. | 360/125.02 |
| 2009/0154026 A1 * | 6/2009 | Jiang et al. | 360/319 |
| 2009/0168240 A1 * | 7/2009 | Hsiao et al. | 360/125.02 |
| 2010/0232062 A1 | 9/2010 | Gao et al. | |
| 2012/0106001 A1 | 5/2012 | Gao et al. | |
| 2013/0022840 A1 * | 1/2013 | Hsiao et al. | 428/815.2 |
| 2014/0016232 A1 * | 1/2014 | Guan | 360/236.4 |

FOREIGN PATENT DOCUMENTS

| | | |
|---|---|---|
| JP | 2010-061735 A | 3/2010 |
| JP | 2011-076652 A | 4/2011 |
| JP | 2011-227987 A | 11/2011 |
| JP | 2012-099208 A | 5/2012 |
| JP | 2012-150863 A | 8/2012 |

OTHER PUBLICATIONS

European Search Report dated Jun. 14, 2013.

* cited by examiner

*Primary Examiner* — Allen T Cao
(74) *Attorney, Agent, or Firm* — Hall Estill Attorneys at Law

(57) ABSTRACT

A magnetic element may be generally configured as a data writer constructed at least with a write pole positioned within and separated from a box shield by a write gap. The box shield may be configured to maintain at least a separation distance from a first side of a leading edge of the write pole to an opposite second side of the leading edge.

20 Claims, 4 Drawing Sheets

WRITE POLE WITH SHAPED BOX SHIELD

SUMMARY

Various embodiments are generally directed to a magnetic element capable of programming data bits in various data storage environments.

In accordance with various embodiments, a magnetic element may generally be configured as a data writer constructed at least with a write pole positioned within and separated from a box shield by a write gap. The box shield may be configured to maintain at least a separation distance from a first side of a leading edge of the write pole to an opposite second side of the leading edge.

DETAILED DESCRIPTION

Emphasis on the form factor and data capacity of data storage devices, especially devices with faster data access times and increased data access reliability, has resulted in the reduced size and increased density of data bits. Such data bit configurations may correspond with smaller data access components, such as data write poles, and increasingly robust magnetic shielding. However, a magnetic element capable of accessing data bits with enough write field and gradient to program data while shielding the magnetic extent of the magnetic element to the size of a data track can be challenging. Hence, there is a continued industry demand for magnetic shield configurations capable of being implemented in reduced form factor data storage devices to provide a magnetic extent that conforms to high data bit density data storage environments without decreasing magnetic field and gradient.

Accordingly, a magnetic element can be configured in accordance with some embodiments to have at least a write pole positioned within a box shield and separated from the box shield by a write gap that maintains at least a separation distance from a first side of a leading edge of the write pole to an opposite second side of the leading edge due to the configuration of the box shield. The tuning of the magnetic element with a separation distance at the leading edge of the write pole can provide shielding accurate enough to define a precise magnetic extent while preventing shield-to-pole shunting that can degrade magnetic field and gradient. Additionally, the tuned leading edge separation distance can mitigate side track erasure and adjacent track interference that can plague magnetic elements in heightened data bit density, reduced form factor data environments.

Figure 1:
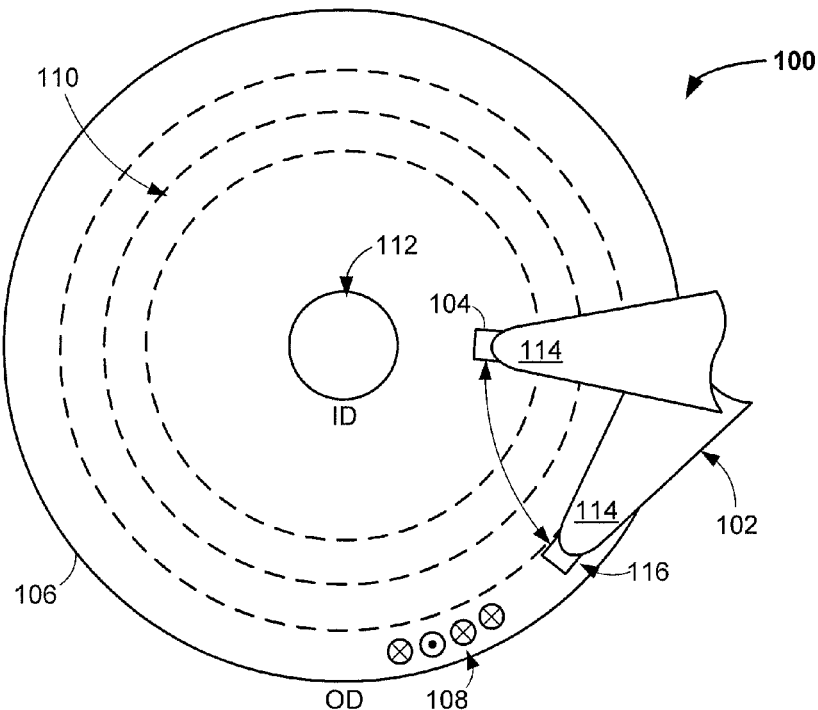
FIG. 1 is a block representation of an example data storage device constructed and operated in accordance with various embodiments.

While a tuned magnetic shield may be practiced in an unlimited variety of environments, FIG. 1 generally illustrates a top view block representation of an example data storage device 100 environment that can utilize a tuned magnetic element in accordance with various embodiments. The data storage device 100 is shown in a non-limiting configuration where an actuating assembly 102 is capable of positioning a transducing head 104 over a variety of locations on a magnetic storage media 106 where stored data bits 108 are located on predetermined data tracks 110 configured with an areal density that determines the storage capacity of the media 106. Movement of the storage media 106 can be facilitated through attachment to one or more spindle motors 112 that rotate during use to produce an air bearing surface (ABS) on which a slider portion 114 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 correspond with alignment of the transducers with the data tracks 110 defined on the storage media surfaces to write, read, and rewrite data. As data bits 108 become more densely positioned in data tracks 110 with smaller radial widths, the head 104 may inadvertently distribute magnetic flux to adjacent data tracks 110, which can produce errors and inaccurate data storage that degrades performance of the data storage device 100.

Figure 2:
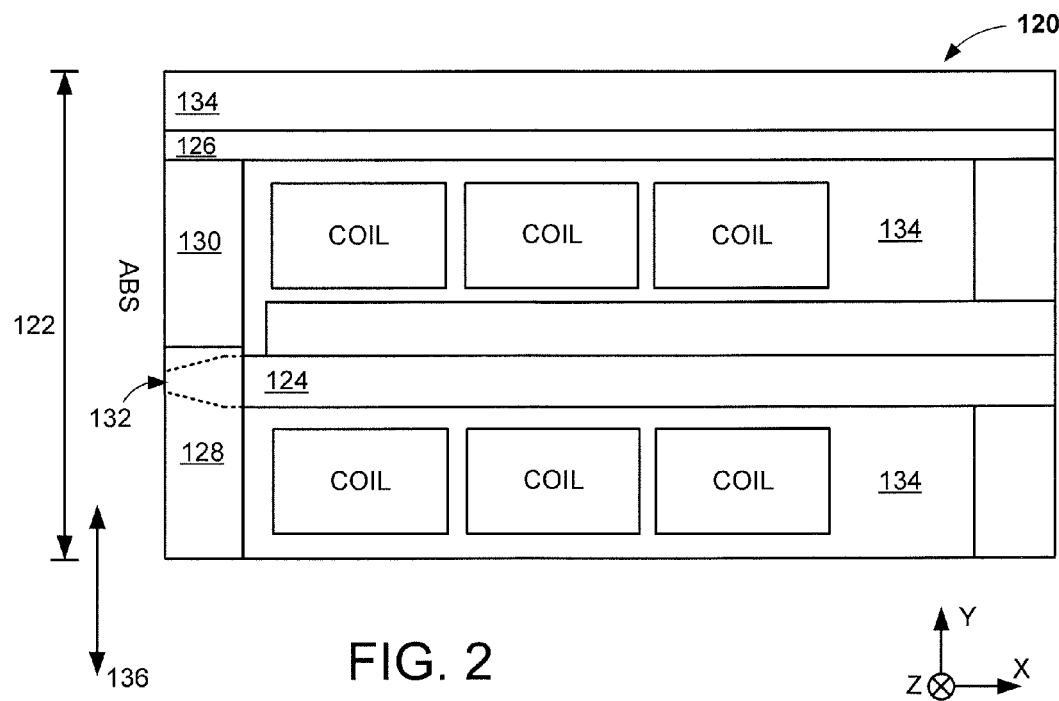
FIG. 2 illustrates a cross-sectional block representation of an example magnetic element capable of being used in the data storage device of FIG. 1.

FIG. 2 displays a cross-sectional block representation of an example magnetic element 120 constructed in accordance with some embodiments to mitigate the effects of reduced form factor data tracks and more densely packed data bits. While the magnetic element 120 can have one or more data access elements, a magnetic data writer 122 portion of the magnetic element 120 is shown, which can operate to write data to an adjacent storage media, such as media 106 of FIG. 1. The magnetic data writer 122 has a main write pole 124 and at least one return pole 126 that creates a writing circuit to impart a predetermined magnetic orientation to the adjacent storage media.

As shown with the non-limiting configuration of the data writer 124, the return pole 126 contacts leading 128 and trailing 130 portions of a ABS shield that form a "box shield" by surrounding the main write pole tip 132, which aids in defining a magnetic extent of the write pole 124 by preventing flux from migrating between poles 124 and 126 beyond a predetermined region of a data storage media across the ABS. The return pole 126 further contacts insulating material 134 that maintains magnetic separation of the coil and magnetically saturated components while preventing unwanted shunting between the write 124 and return 126 pole.

The various shields of the magnetic element 120 can be characterized by their position with respect to the timing of encountering external bits, such as bits 108 of FIG. 1. In other words, the shields that encounter the external bits before the write pole 124 may be characterized as "leading" shields while shields that see the bits after the write pole 124 can be characterized as "trailing" shields. Such characterization extends to the difference between "uptrack" or "downtrack"

of the transducing elements in that, depending on the direction of travel for the magnetic element 120 with respect to a data track 136 and external bits, the shields can be either leading or trailing and either uptrack or downtrack.

While the magnetic element 120 has a plurality of magnetic shields configured to focus magnetic flux from the write pole 124 to a predetermined magnetic extent such as one or more data bits along a data track 136, increased data track densities have led to inadvertent programming of data bits along the Z axis in a side track erasure condition. The addition of side shields in the Z axis with respect to the write pole 124 can reduce the magnetic extent of the write pole 124 to conform to a reduced data track width, but close proximity between shields and the write pole 124 may degrade writing performance as magnetic flux is shunted to the various shields. Such shunting can reduce the write pole's 124 write field amplitude and gradient. The close proximity of the shields to the flux carrying poles 124 and 126 can further cause the shields to retain magnetization and exacerbate side track erasure that leads to poor writeability and large bit error rates.

Figure 3:
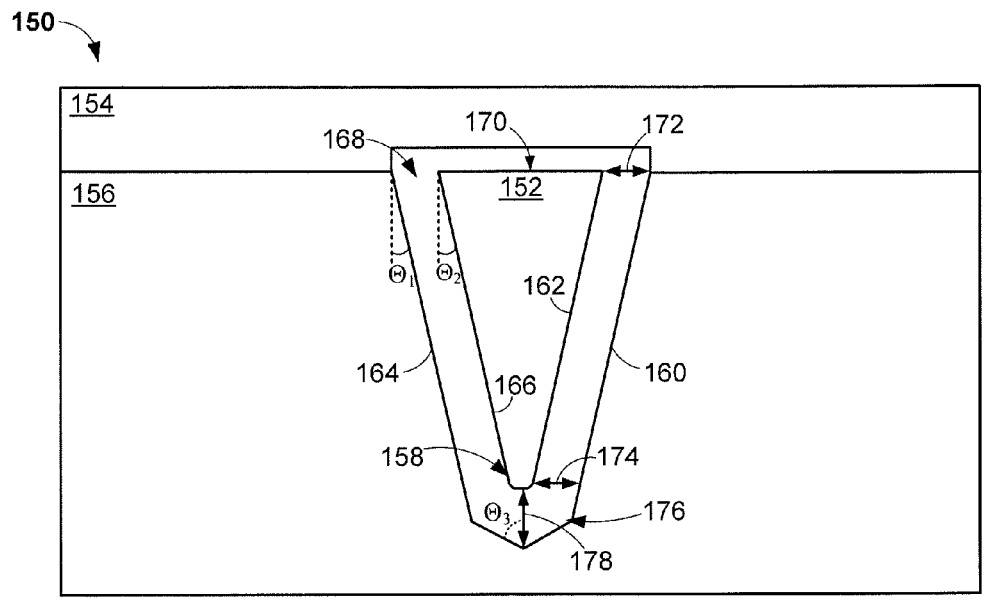
FIG. 3 shows an ABS view block representation of a portion of an example magnetic element constructed in accordance with some embodiments.

With the assortment of construction and operational difficulties in reducing the size of the magnetic element 120 while restricting its magnetic extent to correspond with increased data bit and data track densities, tuning a shield to have more robust shielding and resistance to shunting with a write pole 124 while being in close physical proximity is a continued goal for the data storage industry. FIG. 3 displays an ABS view block representation of a portion of an example data writer 150 constructed in accordance with various embodiments to mitigate shunting while promoting increased write field amplitude and gradient.

The data writer 150 is configured with a trapezoid shaped write pole 152 disposed between a trailing shield 154 and a box shield 156. The box shield 156 continuously extends from a first lateral side along the Z axis to a second lateral side about a leading edge 158 of the write pole 152. That is, the box shield 156 has a first shield sidewall 160 proximal a first pole sidewall 162 and seamlessly extends about the leading edge 158 to a second shield sidewall 164 that is adjacent a second pole sidewall 166. Each shield and pole sidewall can be respectively constructed with matching angular orientations $\theta_1$ and $\eta_2$ that are separated by a continuous write gap 168 that wraps around the shield sidewalls 162 and 164 as well as the leading 158 and trailing 170 edges.

Having the box shield 156 continuously extend from proximal the first pole sidewall 162 to the second pole sidewall 166 can allow for more robust magnetic shielding as no physical seams are present to cause magnetic transitions and coupling localities that can result in more magnetic domains and increased noise, especially from adjacent data tracks in an adjacent track interference condition. During operation of the write pole 152, the leading edge 158 can exhibit increased magnetic concentration, at least in part due to the trapezoidal shape of the pole 152. Such magnetic concentration can be susceptible to shunting, which can be mitigated by tuning the write gap 168 thickness. For example, the distance 172 between the trailing edge 170 of the write pole 152 and the box shield 156 can be tuned to be the same or different than the distance 174 between the leading edge 158 of the write pole 152 and the box shield 156, which can mitigate leading edge erasure conditions that may occur at skew angles when the leading edge 158 of the write pole 152 magnetically or physically extends over or towards an adjacent data track.

The write gap 168 may further be tuned by providing a downtrack write gap portion 176 that is shaped to provide a downtrack separation distance 178 from the leading edge 158 to the box shield 156. In the non-limiting embodiment shown in FIG. 3, the downtrack write gap portion 176 is shaped with linear sidewalls oriented at a predetermined angle $\theta_3$ that meet at a point and maintain at least the leading edge separation distance 174 from the first pole sidewall 162 to the second shield sidewall 166. Such separation distance 174 or a different separation distance may continuously extend along the X axis, distal the ABS by tuning the angular relationship of the box shield 156 to be similar or dissimilar to the angle of the leading edge 158 surface extending away from the ABS. The maintenance of the separation distance 174 about the leading edge 158 may mitigate shunting while shielding magnetic flux to provide a precise magnetic extent.

While a uniform write gap 168 surrounding the write pole 152 may reduce shunting at the leading edge 158, the proximity of the box shield 156 to the trailing edge 170 of the write pole 152 does not provide as much practical shielding and shaping of the magnetic extent of the write pole 152 as the leading edge 158, which may be due at least in part to the concentration of magnetization near the leading edge 158 during operation. In yet, a small trailing edge separation distance 172 can be a detrimental source for shunting and degraded write pole 152 magnetic field and gradient.

Figure 4:
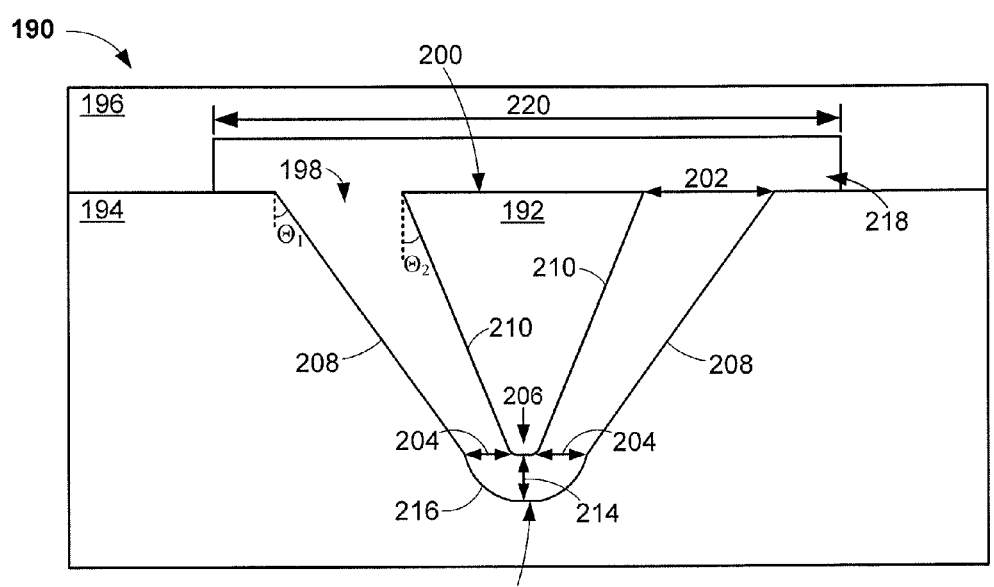
FIG. 4 displays an ABS view block representation of an example magnetic element constructed in accordance with various embodiments.

FIG. 4 displays an ABS view block representation of a portion of an example magnetic element 190 configured in accordance with some embodiments to mitigate shunting while providing optimized magnetic shielding. The magnetic element 190 has a write pole 192 disposed within a box shield 194 and downtrack a trailing shield 196. The write pole 192 is separated from the shields 194 and 196 by a write gap 198 that is tuned to have a varying thickness at predetermined locations. In the non-limiting magnetic element 190, the trailing edge 200 of the write pole 192 is separated from the box shield 194 by a first separation distance 202 and a smaller second separation distance 204 at the leading edge 206 of the write pole 192.

The varying write gap 198 is provided by configuring the box shield sidewalls 208 proximal the pole sidewalls 210 with different angular orientations $\theta_1$ and $\theta_2$, such as the greater linearly angled sidewall 208 compared to the pole sidewall 210 with respect to the Y axis. The varying separation distances 200 and 202 can be tuned in accordance with various embodiments to provide a balance between a bigger magnetic extent of the write pole 192 and reduced shunting through increased separation from the box shield 194 at predetermined locations. That is, the reduced separation distance 204 at the leading edge 206 combined with the larger separation distance 202 at the trailing edge 200 can reduce shunting while still providing accurate shielding.

While the reduced separation distance 204 at the leading edge 206 can aid in accurate shielding, the downtrack portion 212 of the write gap can determine the practical magnetic extent. For example, configuring the downtrack portion 212 with a smaller or greater separation distance 214 than the leading edge separation distance 204 can provide a precise magnetic extent laterally from the leading edge 206, but can be susceptible to side track erasure and adjacent track interference as magnetic flux is emitted downtrack. Thus, configuring the box shield 194 as a continuous layer extending about the leading edge 206 and maintaining the reduced separation distance 204 circumferentially with the downtrack separation distance 214 mitigates downtrack flux emission and accurately defines the magnetic extent of the write pole 192 at the leading edge 206.

In some embodiments, the reduced separation distance 204 is maintained by configuring the downtrack portions of the box shield 194 with continuously curvilinear sidewalls 216, as shown in FIG. 4. Such downtrack portion 212 configuration is not limiting and may be tuned differently to provide a modified magnetic extent of the write pole, such as the increased downtrack separation distance 178 and linear downtrack portion sidewalls shown in FIG. 3. Regardless of how the downtrack portion is tuned and configured, continuously extending the box shield 194 between opposite pole sidewalls 210 about the leading edge 206 reduces downtrack magnetic flux emission while allowing the increased separation distance 200 to reduce shunting and increase write field gradient and amplitude for the write pole 192.

The increased separation distance 200 at the trailing edge 200 between the write pole 192 and box shield 194 can be accentuated by a letterbox region 218 that provides an increased write gap width 220 uptrack from the write pole 192. Tuning the uptrack width 220 can further magnetically isolate the trailing shield 196 from the write pole 192 while mitigating uptrack magnetic flux emission and side track erasure. Through the tuning of the write gap 198 about the leading edge 206 and the letterbox region 218 at the trailing edge 200, magnetic shielding can be optimized in view of decreased shunting to provide heightened write field amplitude and gradient.

Figure 5:
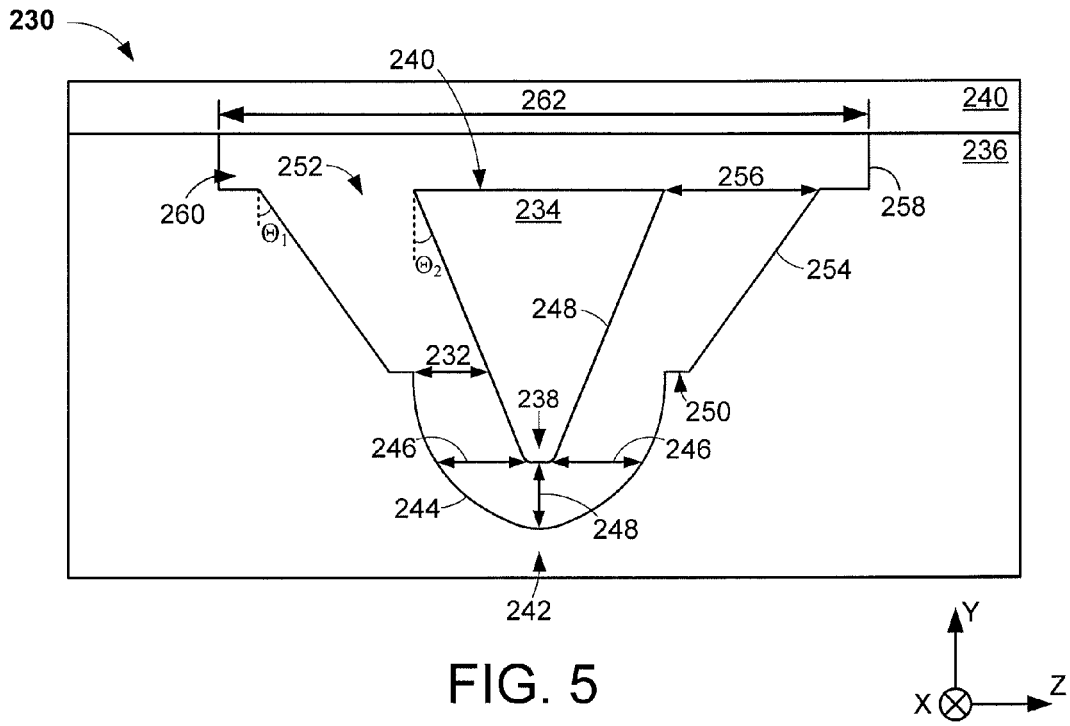
FIG. 5 illustrates an ABS view block representation of a portion of an example magnetic element constructed in accordance with various embodiments.

The tuning of the write gap 198 to a smallest separation distance 204 at the leading 206 edge may provide increased shielding at proximal the leading edge 206 than at locations between the trailing 200 and leading 206 edges, which may be localized areas of magnetic saturation and potential shunting due at least in part to the shape of the write pole 192. FIG. 5 displays an ABS view block representation of a portion of an example data writer 230 constructed and operated in accordance with various embodiments. The tuned configuration of the data writer 230 positions a minimum write gap separation distance 232 between a write pole 234 and box shield 236 at a location intermediate of leading 238 and trailing 240 edges of the pole sidewalls 248.

The intermediate location of the minimum separation distance 232 can allow the downtrack portion 242 of the box shield 236 to be shaped to encompass more of the write pole 234 and leading edge 238. In the non-limiting embodiment shown, the downtrack portion 242 is configured with continuously curvilinear sidewall 244 that provides lateral 246 and downtrack 248 separation distances that are tuned to maintain the minimum separation distance 232 around the leading edge 238 of the write pole 234. The ability to tune the lateral 246 and downtrack 248 separation distances to similar or dissimilar lengths with the shape of the curvilinear sidewall 244 provides additional means for optimizing the shielding proximal the leading edge 238 while mitigating shunting.

Constructing the box shield 236 with a tuned downtrack portion 242 can ease the formation of the data writer 230 by reducing process difficulties involving maintaining a tight write gap about the leading edge 238. The tuned downtrack portion 242 of the box shield 236 may take an unlimited variety of shapes and sizes, but in some embodiments may have a transition surface 250 that laterally extends along the Z axis directly away from the write pole 234 to increase the write gap 252 thickness. The transition surface 250 can be configured to have a different angle and length than both the curvilinear sidewall 244 and the trailing sidewall 254 to provide a predetermined write gap 252 immediately uptrack from the minimum separation distance 232.

The increased write gap 252 thickness provided by the transition surface 250 can give more room for the trailing sidewalls 254 to be tuned to angular orientations $\theta_1$ and shapes that perhaps were not possible with closer proximity to the pole sidewalls 248. For example, the trailing sidewall 254 may be configured with a protrusion or negatively angled portion that decreases the write gap 252 proximal the trailing edge 240. Conversely in the embodiment shown in FIG. 5, the trailing sidewalls 254 have a different taper angle $\theta_1$ than the angle $\theta_2$ of the pole sidewall 248 to uniformly and continuously increase the write gap 252 from the transition surface 250 to a trailing separation distance 256 laterally adjacent the trailing edge 240 of the write pole 234.

The box shield 236 may further be configured to define letterbox sidewalls 258 on opposite sides of the letterbox region 260 uptrack from the write pole 234. In contrast to the box shield 194 of FIG. 4 that defined a lower surface of the letterbox region 218, the box shield 236 extends to define the letterbox sidewalls 258 and consequently the letterbox width 262 along the Z axis. By defining more of the letterbox region 260 with the box shield 236 as opposed to the trailing shield 240, magnetic continuity of the box shield 236 can be extended farther uptrack from the write pole 234 due to the material seam between the box 236 and trailing 240 shields is farther away from the write pole 234.

With the various tunable features of the box shield 236, such as the downtrack portion 242, transition surface 250, and letterbox region 260, the data writer 230 can be customized with magnetic shielding to provide optimized shunting reduction and magnetic extent definition that can accommodate a variety of reduced form factor, high data bit density data storage devices. However, the tuning of the configuration of the box shield 236 is not the only means for optimizing the balance between shunting and magnetic extent definition as the box shield 194 can be tuned for material composition.

Figure 6:
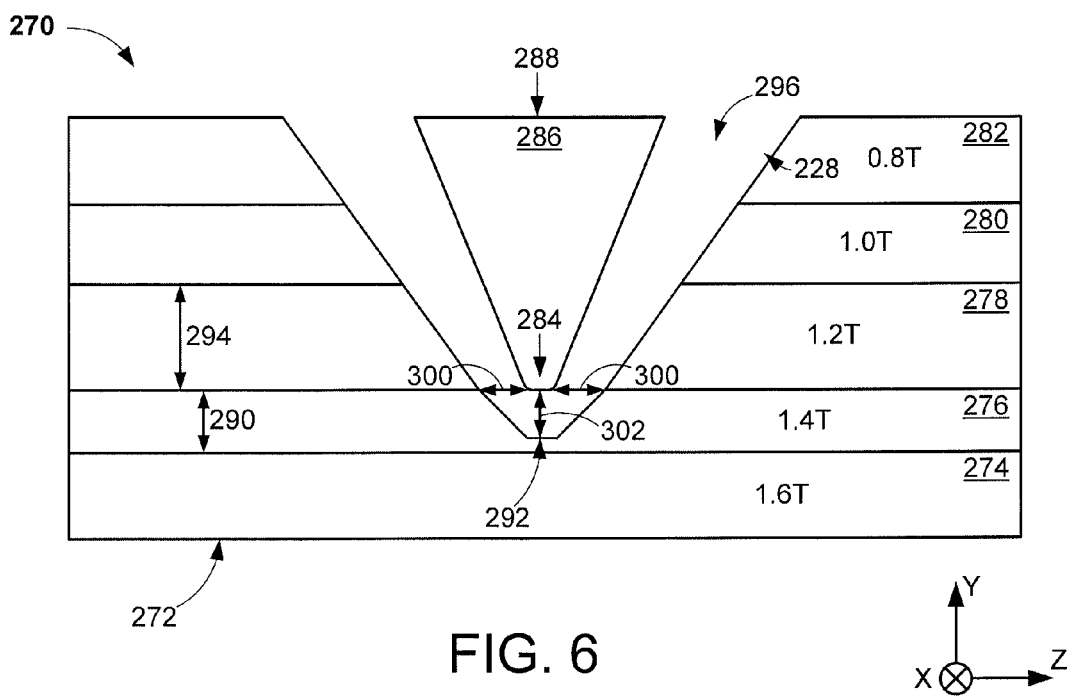
FIG. 6 is an ABS view block representation of a portion of an example magnetic element constructed in accordance with some embodiments.

FIG. 6 generally illustrates an ABS view block representation of a portion of an example magnetic element 270 constructed with a tuned box shield 272 in accordance with some embodiments. The box shield 272 is constructed from a vertical aggregate of shield sub-layers 274, 276, 278, 280, and 282 that enclose the leading edge 284 of the write pole 286 with materials exhibiting different magnetic moments.

While the varying magnetic moments can be positioned in an unlimited variety of configurations about the write pole 286, the exemplary configuration in FIG. 6 gradually and uniformly decreases the magnetic moment of the various layers from downtrack to uptrack. That is, each shield sub-layer extends on either side of the write pole 286 and from proximal the leading edge 284, such as 1.6 Tesla, to proximal the trailing edge 288, such as 0.8 Tesla, and has a lower magnetic moment by a uniform decrease, such as 0.2 Tesla.

The difference in sub-layer magnetic moment can be configured by adjusting sub-layer materials, thickness, and deposition technique, none of which are required or limiting. For instance, sub-layer 276 can have a first thickness 290 that defines part of the downtrack portion 292 and is different from a second thickness 294 of sub-layer 278. The ability to tune one or more shield sub-layers for magnetic moment, thickness, and material can optimize shielding while minimizing shunting and increasing magnetic moment along a downtrack direction (Y Axis) as the thinnest portions of the write gap 296 are proximal high magnetic moment sub-layers. However, the use of shield sub-layers in a graded lamination does not preclude the ability to tune the shield sidewalls 298 to have a decreasing write gap 296 from the trailing edge 288 to the leading edge 284 and the downtrack portion 292 to maintain the leading edge separation distance 300 around the leading edge 284 including a downtrack distance 302.

Figure 7A:
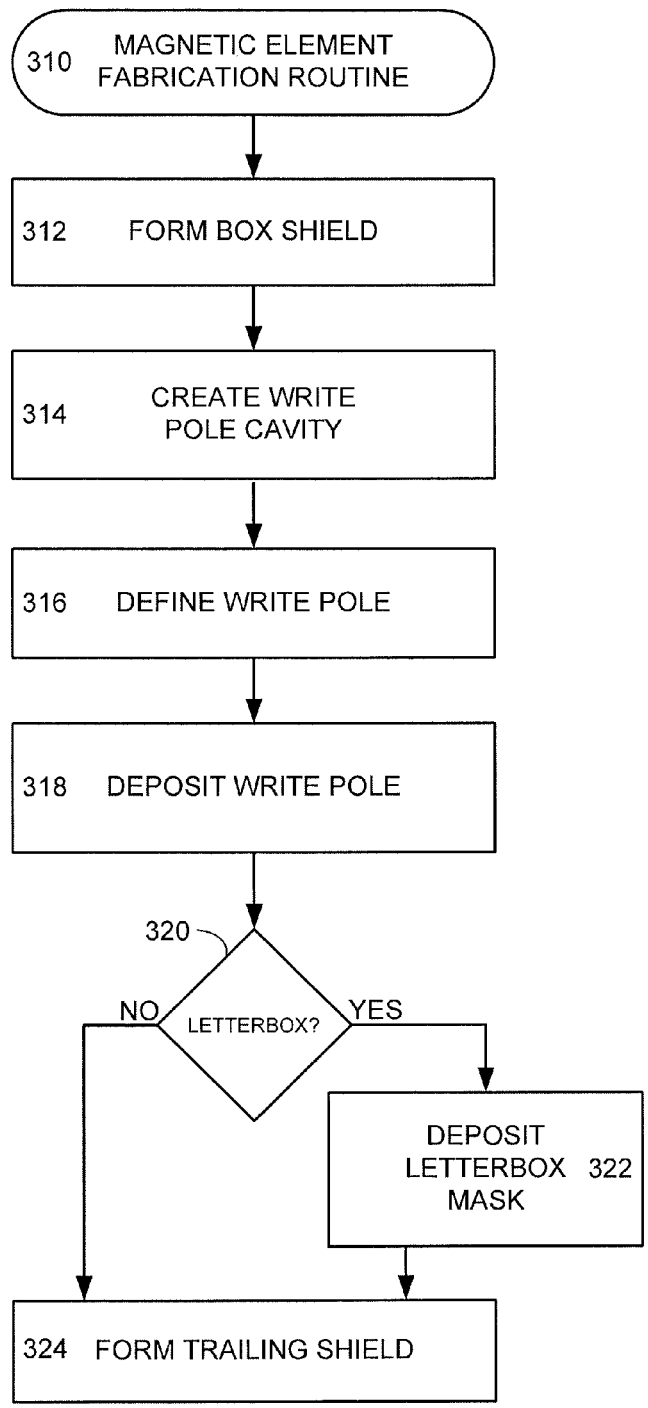
FIGS. 7A and 7B provide a flowchart and associated illustrations for an example data writer fabrication routine in accordance with various embodiments.
Figure 7B:
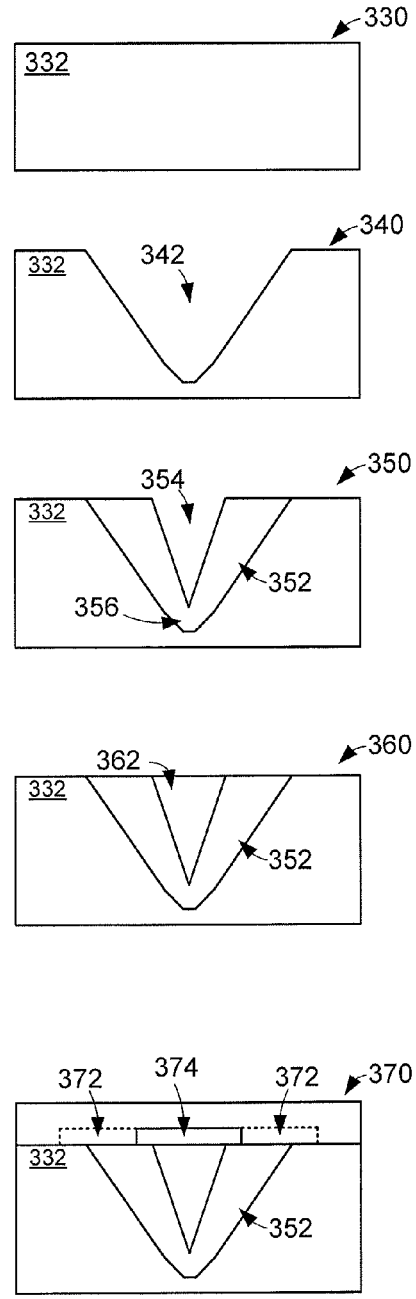

With the variety of non-limiting box shield 272 configurations possible to optimize write pole performance; the construction of a magnetic element can undergo a series of decisions and steps to tune the magnetic operation. FIGS. 7A and 7B provides an example magnetic element fabrication routine 310 conducted in accordance with various embodiments to tune the shunting and shielding characteristics of a box shield. Initially, the routine 310 forms a box shield in step 312 as a single layer of material or as a lamination of layers with different magnetic moments, which is illustrated by element 330 where a single layer of material 332 is ready to be processed.

Step 314 subsequently creates a predetermined write cavity with shield sidewalls oriented at predetermined angular orientations, as displayed by element 340 and cavity 342. The shield sidewalls are then covered in step 316 with a non-magnetic write gap material that can be deposited in one or more layers to provide a uniform or varying write gap thickness along the shield sidewall and define a write pole cavity. As shown in element 350, the write cavity 342 is filled with write gap material 352 that creates a different sidewall taper than the shield sidewall to define a write pole cavity 354. It should be noted that step 316 may be conducted with a variety of deposition means, such as oblique incidence angle sputtering, and can further include shaping the downtrack write gap portion 356 to a predetermined shape, such as curvilinear, and size.

Step 318 can next fill the write pole cavity with a write pole material that takes the shape of the cavity and is separated from the box shield by the continuous write gap material, which is shown by element 360 and write pole 362. Formation of the write pole in step 318 brings routine 310 to decision 320 where the inclusion of a letterbox region is evaluated. If a letterbox, such as letterbox region 372 of element 370, is chosen in decision 320, step 322 deposits a letterbox mask shaped with a predetermined width to form the letterbox region with the inclusion of the trailing shield. A decision not to include a letterbox region can proceed to step 324 where a non-magnetic insert, such as insert 374 of element 370 is deposited atop the write pole to complete the write gap and magnetically isolate the write pole from the trailing shield.

Through the various steps and decisions of routine 310, a magnetic element can be constructed with tuned magnetic shielding and optimized shunting. It should be noted, however, that the various steps and decisions of routine 310 shown in FIGS. 7A and 7B are not required or limited as the various decisions and steps can be omitted, changed, and added. As an example, an additional decision can be evaluated to determine how many layers are to be included in the box shield.

With the various tuned aspects of the box shield, magnetic performance of the write pole can be catered to provide a precise magnetic extent while reducing chance of shunting between the write pole and the box shield. Such reduced shunting can provide increased magnetic write field amplitude and gradient that aids in programming densely organized data bits. Moreover, the ability to tune the shape of the letterbox region proximal the trailing edge and downtrack portion proximal the leading edge reduces magnetic flux emission and mitigates side track erasure and adjacent track interference conditions.

In addition, while the embodiments have been directed to magnetic programming, it will be appreciated that the claimed technology can readily be utilized in any number of other applications, including data storage device applications. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole disposed between and separated from a box shield by a write gap, the box shield comprising a plurality of sub-layers and configured to maintain at least a predetermined distance from a first side of a leading edge of the write pole to an opposite second side of the leading edge.

2. The apparatus of claim 1, wherein the box shield continuously extends to opposite sides of the write pole.

3. The apparatus of claim 1, wherein each sub-layer has a different magnetic moment.

4. The apparatus of claim 1, wherein the plurality of sub-layers gradually and uniformly decreases in magnetic moment along a downtrack direction.

5. The apparatus of claim 1, wherein the box shield defines a letterbox region uptrack from the write pole.

6. The apparatus of claim 5, wherein the box shield defines lateral sidewalls of the letterbox region.

7. The apparatus of claim 1, wherein the write gap is a uniform thickness about lateral sides and the leading edge of the write pole.

8. The apparatus of claim 1, wherein the predetermined distance is the closest point between the write pole and box shield.

9. The apparatus of claim 1, wherein first and second sub-layers of the plurality of sub-layers have different thicknesses.

10. The apparatus of claim 1, wherein multiple sub-layers of the plurality of sub-layers continuously extend from a first lateral side of the write pole to a second lateral side of the write pole opposite the first lateral side.

11. A magnetic element comprising a write pole separated from a box shield by a write gap, the write gap decreasing from a first predetermined distance at a trailing edge of the write pole to second predetermined distance at a leading edge of the write pole, the box shield comprising a transition surface extending directly away from the write pole at a point intermediate of the leading and trailing edges, the box shield configured to maintain at least the second predetermined distance from a first side of the leading edge to an opposite second side of the leading edge.

12. The magnetic element of claim 11, wherein the box shield comprises a downtrack portion shaped about the leading edge.

13. The magnetic element of claim 12, wherein the downtrack portion comprises continuously curvilinear sidewalls.

14. The magnetic element of claim 12, wherein the downtrack portion comprises linear sidewalls.

15. The magnetic element of claim 12, wherein the downtrack portion has a downtrack predetermined distance greater than the second predetermined distance.

16. The magnetic element of claim 11, wherein the box shield comprises a negatively angled side shield sidewall between the leading and trailing edges.

17. The magnetic element of claim 11, wherein a letterbox region increases the write gap with a rectangular shape proximal the trailing edge.

18. A data writer comprising a write pole having leading and trailing edges connected by first and second pole sidewalls on opposite first and second sides of the write pole, the write pole disposed within and separated from a side shield by a write gap that decreases from a first predetermined distance at the trailing edge to a second predetermined distance at the leading edge, each side shield comprising a continuously linear sidewall extending from a box shield, the box shield configured to maintain at least the second predetermined distance from the first pole sidewall to the second pole sidewall around the leading edge.

19. The data writer of claim 18, wherein the box shield maintains the predetermined distance at a downtrack location between the first and second pole sidewalls.

20. The data writer of claim 18, wherein a trailing shield contacts the side shields and is separated from the write pole by a letterbox region that increases the write gap.

* * * * *